United States Patent
Xu et al.

(10) Patent No.: US 10,844,239 B2
(45) Date of Patent: Nov. 24, 2020

(54) TWO-COMPONENT EPOXY RESIN PAINT

(71) Applicant: The Sherwin-Williams Company, Cleveland, OH (US)

(72) Inventors: Wanjun Xu, Shanghai (CN); Fan Yang, Shanghai (CN); Daqian Pei, Shanghai (CN)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 16/094,415

(22) PCT Filed: Apr. 17, 2017

(86) PCT No.: PCT/US2017/027941
§ 371 (c)(1),
(2) Date: Oct. 17, 2018

(87) PCT Pub. No.: WO2017/184514
PCT Pub. Date: Oct. 26, 2017

(65) Prior Publication Data
US 2019/0119521 A1    Apr. 25, 2019

(30) Foreign Application Priority Data

Apr. 19, 2016 (CN) .......................... 2016 1 0242602

(51) Int. Cl.
| | | |
|---|---|---|
| *C09D 163/00* | (2006.01) | |
| *C08G 59/44* | (2006.01) | |
| *C08G 59/60* | (2006.01) | |
| *C08G 69/26* | (2006.01) | |
| *C08G 59/56* | (2006.01) | |
| *C08G 69/34* | (2006.01) | |
| *C08L 77/08* | (2006.01) | |
| *C08G 59/40* | (2006.01) | |
| *C08G 59/46* | (2006.01) | |
| *C09D 7/61* | (2018.01) | |
| *C09D 5/00* | (2006.01) | |
| *C09D 5/08* | (2006.01) | |

(52) U.S. Cl.
CPC ....... *C09D 163/00* (2013.01); *C08G 59/4014* (2013.01); *C08G 59/44* (2013.01); *C08G 59/46* (2013.01); *C08G 59/56* (2013.01); *C08G 59/60* (2013.01); *C08G 69/265* (2013.01); *C08G 69/34* (2013.01); *C08L 77/08* (2013.01); *C09D 5/002* (2013.01); *C09D 5/08* (2013.01); *C09D 7/61* (2018.01)

(58) Field of Classification Search
CPC ............................ C09G 59/4014; C09G 59/46
See application file for complete search history.

(56) References Cited

U.S. PATENT DOCUMENTS

| | | | | |
|---|---|---|---|---|
| 4,003,959 | A * | 1/1977 | Wada | ................. C08L 63/00 |
| | | | | 525/137 |
| 6,376,579 | B1 * | 4/2002 | Mishra | ................. C04B 41/009 |
| | | | | 523/466 |
| 2002/0054957 | A1 | 5/2002 | Johnsen et al. | |
| 2004/0048954 | A1 | 3/2004 | Thieben | |
| 2010/0012888 | A1 | 1/2010 | Sato et al. | |
| 2015/0094400 | A1 | 4/2015 | Zheng et al. | |

FOREIGN PATENT DOCUMENTS

| | | |
|---|---|---|
| CN | 101372600 A | 2/2009 |
| CN | 101585906 A | 11/2009 |
| CN | 102134306 A | 7/2011 |
| CN | 102719171 | 10/2012 |
| CN | 104610840 A * | 5/2015 |
| EP | 1788048 | 10/2010 |
| JP | 2005248168 | 9/2005 |
| KR | 1020070070882 | 7/2007 |
| WO | 2004024792 A1 | 3/2004 |
| WO | 2006016625 | 5/2008 |

OTHER PUBLICATIONS

English machine translation of CN-104610840-A (Year: 2015).*
Versamid 125 data sheet; https://www.guidechem.com/reference/dic-416220.html (Year: 2019).*
D.E.R 660-MAK80 product sheet (no date).*
Communication Pursuant to Rules 161(1) and 162 EPC dated Nov. 29, 2018 from counterpart European Application No. 17786414.7, 3 pp.
International Search Report and Written Opinion of International Application No. PCT/US2017/027941, dated Aug. 8, 2017, 11 pp.
International Preliminary Report on Patentability from International Application No. PCT/US2017/027941, dated Nov. 1, 2018, 6 pp.
Extended Search Report from counterpart European Application No. 17786414.7, dated Nov. 6, 2019, 6 pp.
The Notification of Rejection, and translation thereof, from counterpart Japanese Application No. 2018-554496, dated Nov. 27, 2019, 11 pp.
Office Action from counterpart Canadian Application No. 3,021,308 dated Oct. 21, 2019, 3 pp.

(Continued)

*Primary Examiner* — Peter F Godenschwager
(74) *Attorney, Agent, or Firm* — Shumaker & Sieffert, P.A.

(57) ABSTRACT

The present disclosure is directed to a two-component epoxy resin paint, comprising a) an epoxy resin component; and b) an amine component for curing the epoxy resin component, the amine component comprising: i) at least one polyamide curing agent; and ii) at least one Mannich base curing agent, wherein at least one of the polyamide curing agent and the Mannich base curing agent is derived from one or more multifunctional amines comprising at least one cycloaliphatic multifunctional amine, and wherein the cycloaliphatic multifunctional amine is present in an amount of 30 wt % or more relative to the total amount of the multifunctional amines, wherein the ratio by weight of the epoxy resin component a) to the amine component b) is in the range of 100:8 to 100:20.

17 Claims, No Drawings

(56) References Cited

OTHER PUBLICATIONS

Response to Office Action from counterpart Canadian Application No. 3,021,308 dated Apr. 21, 2020, 14 pp.
Response to Extended Search Report dated Nov. 26, 2019, from counterpart European Application No. 17786414.7, filed Jun. 5, 2020, 18 pp.
The Notification of Rejection, and translation thereof, from counterpart Japanese Application No. 2018-554496, dated May 19, 2020, 5 pp.
The Notification of Rejection, and translation thereof, from counterpart Korean Application No. 10-2018-7033225, dated May 7, 2020, 9 pp.
Examination Report dated Jun. 9, 2020, from counterpart Canadian Application No. 3,021,308, 3 pp.

* cited by examiner

TWO-COMPONENT EPOXY RESIN PAINT

This application is a national stage application under 35 U.S.C. § 371 of PCT Application No. PCT/US2017/027941, filed Apr. 17, 2017, which claims the benefit of Chinese Application No. 201610242602.7, filed Apr. 19, 2016. The entire contents of each of PCT Application No. PCT/US2017/027941 and Chinese Application No. 201610242602.7 are incorporated herein by reference in their entirety.

TECHNICAL FIELD

The present disclosure relates to a two-component epoxy resin paint, more particularly a two-component epoxy resin paint with a balance of a long pot life and a fast drying speed, especially a two-component epoxy resin primer.

BACKGROUND

Epoxy resin is widely used in the coating industry. Upon curing, an epoxy resin-amine curing system, also known as a two-component epoxy resin paint, provides a coating having good adhesion to a substrate, especially a metal substrate, and having high mechanical strength, good chemical resistance and corrosion resistance. Therefore, epoxy resin paint is regarded as one of the most cost-effective coating compositions for providing corrosion resistance in industry.

Pot life and drying speed of epoxy resin paint are two important parameters for determining the application of the epoxy resin paint. In some embodiments, to ensure optimum production effectiveness, the epoxy resin paint should be formulated to have a long pot life and dry quickly. In some embodiments, selection of a suitable curing agent can provide a balance of these two properties. In addition, in some embodiments, components of the epoxy resin paint can be selected to provide good corrosion resistance.

SUMMARY

In one aspect, the present disclosure provides an epoxy resin paint having a balance of pot life and drying speed, as well as excellent corrosion resistance.

In one embodiment, the present disclosure provides a two-component epoxy resin paint, including: a) an epoxy resin component; and b) an amine component for curing the epoxy resin component. The amine component preferably includes: i) at least one polyamide curing agent; and ii) at least one Mannich base curing agent.

In some embodiments, at least one of the polyamide curing agent and the Mannich base curing agent is derived from one or more multifunctional amines including at least one cycloaliphatic multifunctional amine, wherein the cycloaliphatic multifunctional amine is present in an amount of 30 wt % or more relative to the total amount of the multifunctional amines. In some embodiments, the ratio by weight of the epoxy resin component a) to the amine component b) is 100:8 to 100:20.

In some embodiments, the amine component further includes a curing accelerator, which can be chosen from a tertiary amine containing a phenolic hydroxyl group. In some embodiments, the epoxy resin component further includes a liquid petroleum resin.

The inventors have surprisingly found that an epoxy resin paint with a balance of pot life and drying speed may be obtained by using a curing agent for curing epoxy resin components that includes at least one polyamide curing agent and at least one Mannich base curing agent. At least one of the polyamide curing agent and the Mannich base curing agent is derived from one or more multifunctional amines including at least one cycloaliphatic multifunctional amine. The coating from the epoxy resin paint also exhibits an excellent corrosion resistance.

In some two-component epoxy resin paints of the present disclosure, the combination of polyamide curing agent and Mannich base curing agent as amine component for curing the epoxy resin results in the epoxy resin paint being primarily cured when applied at ambient temperature (for example 20° C.). Without being bound by theory, the primary cure is apparently initiated by active amine hydrogen atoms and thus the coating's viscosity increases slowly. Therefore, in some embodiments the epoxy resin paint has a relatively longer pot life at ambient temperature. When at the coating is exposed to an elevated temperature (for example 40° C.), the ethylenically unsaturated group such as carbon-carbon double bond and the phenolic hydroxyl group contained in the amine component will carry out secondary curing so that the epoxy resin paint may achieve fast drying at such a temperature. As a result, the formulated epoxy resin paint may achieve a balance of longer pot life and fast curing.

In some embodiments, incorporation of a suitable amount of cycloaliphatic group such as cyclopentyl or cyclohexyl into at least one of the polyamide curing agent and Mannich base curing agent will not affect or not significantly affect the curing performance of the amine component, but can provide an epoxy resin paint having good corrosion resistance. Thus, the epoxy resin paint has a balance of longer pot life and fast drying speed, as well as good corrosion resistance.

In some embodiments, the present amine component as a curing agent may effectively cure various kinds of epoxy resin, thereby broadening the window for an epoxy resin component.

The details of one or more embodiments of the invention will be set forth in the description below. The other features, objectives, and advantages of the invention will become apparent.

Selected Definitions

As used herein, "a", "an", "the", "at least one", and "one or more" are used interchangeably, unless indicated otherwise. Thus, for example, a coating composition that comprises "an" additive can be interpreted to mean that the coating composition includes "one or more" additives.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not specifically mentioned in this disclosure, as long as such components or steps do not affect the basic and novel characteristics of the invention, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

The term "polyamide curing agent" as used herein refers to a polyamide resin having two or more active amino groups. For example, the polyamide curing agent may be prepared by reacting one or more excess multifunctional amines with one or more fatty dimers.

The term "Mannich base curing agent" as used herein is also known as a phenolic aldehyde-amine curing agent. For example, the Mannich base curing agent may be prepared by modifying a phenolic aldehyde adduct with one or more excess multifunctional amines.

The term "ethylenically unsaturated functional group" as used herein refers to reactive carbon-carbon double unsaturated group having cis- or trans-configuration excluding aromatic unsaturated group, carbon-carbon triple bond and carbon-heteroatom unsaturated group.

The term "phenolic hydroxyl group" as used herein refers to hydroxyl group attached directly to aromatic rings.

As used in the context of "two-component epoxy resin paint", the term "pot life" refers to the period of time during which the viscosity of the resin paint may reach at most 2 times its initial viscosity at room temperature after mixing two components of the two-component epoxy resin paint.

The term "primer" as used herein refers to a coating composition which may be applied to a metal substrate and, when dried, crosslinked or otherwise hardened, provides a tack-free continuous film sufficiently well adhered to the substrate.

The term "topcoat" as used herein refers to a coating composition which may be applied to a primer and which, when dried or otherwise hardened, provides a protective or decorative outermost finish layer. Furthermore, topcoat coating compositions referred to herein are capable of resisting outdoor exposure for an extended period without visual acceptable degradation.

The term "intermediate coat" as used herein refers to a coating composition which may be applied between a primer and a topcoat and, when dried, crosslinked or otherwise hardened, provides one or more tack-free continuous film between the primer and the topcoat.

The term "direct to Metal (DTM) coating" refers to a coating composition which may be applied to a metal substrate and, when dried, crosslinked or otherwise hardened, provides a tack-free continuous film sufficiently well adhered to the substrate. The continuous film obtained from the MTM coating is capable of resisting outdoor exposure for an extended period without visual acceptable degradation.

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

DETAILED DESCRIPTION

In one embodiment, the present disclosure provides a two-component epoxy resin paint, comprising a) an epoxy resin component; and b) an amine component for curing the epoxy resin component, the amine component comprising: i) at least one polyamide curing agent; and ii) at least one Mannich base curing agent, wherein at least one of the polyamide curing agent and the Mannich base curing agent is derived from one or more multifunctional amines comprising at least one cycloaliphatic multifunctional amine, and wherein the cycloaliphatic multifunctional amine is present in an amount of 30 wt % or more relative to the total amount of the multifunctional amines, wherein the ratio by weight of the epoxy resin component a) to the amine component b) is in the range of 100:8 to 100:20.

Amine Component

According to the present disclosure, an amine component is used as a curing agent for curing an epoxy resin component. The amine component preferably includes at least one polyamide curing agent; and at least one Mannich base curing agent, wherein at least one of the polyamide curing agent and the Mannich base curing agent is derived from one or more multifunctional amines comprising at least one cycloaliphatic multifunctional amine.

In one embodiment of the present disclosure, the polyamide curing agent is derived from one or more multifunctional amines including at least one cycloaliphatic multifunctional amine.

In one embodiment of the present disclosure, the Mannich base curing agent is derived from one or more multifunctional amines including at least one cycloaliphatic multifunctional amine.

In one embodiment of the present disclosure, the polyamide curing agent and the Mannich base curing agent both are derived from one or more multifunctional amines including at least one cycloaliphatic multifunctional amine.

According to the present disclosure, the term "cycloaliphatic multifunctional amine" refers to a multifunctional amine containing at least one cycloaliphatic group. In various embodiments, the cycloaliphatic multifunctional amine includes those having at least one cyclohexyl, cycloheptyl, or cyclopentyl, or the combination thereof. Examples of cycloaliphatic multifunctional amines include, but are not limited to, 1,4-diamino cyclohexane, 4,4'-diamino dicyclohexyl methane, 1,3-diamino cyclopentane, 4,4-diamino dicyclohexyl sulphone, 4,4-diamino dicyclohexyl propane, 4,4'-diamino dicyclopentyl propane, 3,3'-dimethyl-4,4'-diamino dicyclohexyl methane and 3-aminomethyl-3,3,5-trimethylcyclohexyl amine (also known as isophorone diamine).

Suitable cycloaliphatic multifunctional amines are available commercially under the trade designations ANCAMINE 2264, ANCAMINE 2280, ANACMINE 2286 and the like from Airproducts and Chemicals Inc, Allentown, Pa., USA, under the trade designations BAXXODUR EC 331 from BASF, Ludwigshafen, Germany, under the trade designation VERSAMINE C31 from Cognis, Monheim, Germany, or under the trade designation EPICURE 3300 from Momentive Specialty Chemicals, Inc., Columbus, Ohio, USA.

According to the present disclosure, suitable multifunctional amines are chosen from aliphatic multifunctional amines, aromatic multifunctional amines or combinations thereof. Exemplary aliphatic multifunctional amines include polyethylene amines, for example diethylene triamine, triethylene tetraamine, tetraethylene pentaamine, pentaethylene hexamine, 1,6-hexamethylene diamine, 3,3,5-trimethyl-1,6-hexamethylene diamine, 3,5,5-trimethyl-1,6-hexamethylene diamine, 2-methyl-1,5-pentamethylene diamine, which may be available commercially under the trade designation Dytek-A from Invista, Wilmington, Del., di-(3-aminopropyl)amine, N,N'-di-(3-aminopropyl)-1,2-ethylene diamine, N,N-dimethyl-1,3-propylene diamine, N,N-ethyl-1,3-propylene diamine, amino ethylpiperazine or combinations thereof. Moreover, as aliphatic multifunctional amine, polyether multifunctional amines may also be used, such as poly(alkyleneoxy)diamine or triamine under the trade designation Jeffamine from Huntsman Corporation, Woodlands, Tex. Exemplary examples include, but are not limited to, D-230, D-400, D-2000, D-4000, T-403, EDR-148, EDR-192, C-346, ED-600, ED-900, ED-2001, or combinations thereof.

Exemplary aromatic multifunctional amines include ortho-toluene diamine, meta-toluene diamine, meta-phenylene diamine, methylene bridged di(phenylene)amine, and mixtures or combinations thereof.

In some embodiments, the multifunctional amine includes 30 wt % or more of cycloaliphatic multifunctional amine, or 40 wt % or more of cycloaliphatic multifunctional amine, or 50 wt % or more of cycloaliphatic multifunctional amine relative to the total amount of the multifunctional amine. There is no particular limitation to the upper limit to the amount of the cycloaliphatic multifunctional amine, for example, and in some embodiments no more than 90 wt %, or no more than 80 wt %, or even no more than 70 wt % may be used. Incorporation of a suitable amount of cycloaliphatic groups into a polyamide curing agent and/or Mannich base curing agent by using one or more multifunctional amine including at least one of cylcoaliphatic multifunctional amine makes it possible to formulate an epoxy resin paint having a balance of longer pot life and high drying speed, as well as good corrosion resistance.

It has been surprisingly found by the inventors that compared to the two-component epoxy resin paint formulated by directly mixing cycloaliphatic multifunctional amine with a curing component comprising a polyamine curing agent and Mannich base curing agent, the two-component epoxy resin paint according to the present disclosure formulated with the amine component described above would achieve a balance of longer pot life and fast drying speed, while providing good corrosive resistance.

In various embodiments, the polyamide curing agent may have an amine value of 100 mg KOH/g curing agent or more, or 120 mg KOH/g curing agent or more, or preferably 150 mg KOH/g curing agent or more. In most applications, the amine value of the polyamide curing agent is no greater than 300 mg KOH/g curing agent, or no greater than 250 mg KOH/g curing agent, or no greater than 200 mg KOH/g curing agent. The amine value may be determined according to GB/T 6365-2006. In some embodiments, it has been observed that the polyamide curing agent having too high amine value, for example having 300 mg KOH/g curing agent or more, may negatively affect the pot life of the two-component epoxy resin paint.

In various embodiments, the polyamide curing agent may include 1 wt % or more of ethylenically unsaturated functional groups relative to the total weight of the polyamide curing agent, or 2 wt % or more, 4 wt % or more, 5 wt % or more, or 8 wt % or more relative to the total weight of the polyamide curing agent. The polyamide curing agent preferably includes a higher concentration of ethylenically unsaturated functional groups, but in various embodiments the concentration of ethylenically unsaturated groups is less than 15 wt % relative to the total weight of the polyamide curing agent. The concentration of the ethylenically unsaturated groups in the polyamide curing agent can be evaluated as follows:

$$C_{C=C}(\% \text{ by weight})=n \times M_{C=C}/W_{polyamide\ curing\ agent}$$

where $C_{C=C}$ represents the concentration of the ethylenically unsaturated group, n represents the total molar amount of ethylenically unsaturated group contained in feedstock for preparing the polyamide curing agent, $M_{C=C}$ represents the molar mass of the carbon-carbon double bond, and $W_{polyamide\ curing\ agent}$ represents the total weight of the polyamide curing agent as prepared.

The concentration of ethylenically unsaturated groups falling within above range is sufficient to make it possible for the polyamide curing agent to strengthen the drying performance of two-component epoxy resin paint when the resin paint is cured at an elevated temperature, for example, at a temperature of 40° C.

In various embodiments, the polyamide curing agent has a viscosity of 2000 mPa·s or more at 25° C., preferably 2500 mPa·s or more at 25° C., more preferably 3000 mPa·s or more at 25° C. The viscosity of the polyamide curing agent should not be greater than 5000 mPa·s at 25° C. The viscosity may be determined with Brookfield viscosimeter using No. 3 spindle at about 20 rpm. It has been observed that when the polyamide curing agent has too high viscosity, for example, 5000 mPa·s at 25° C. or higher, its curing performance will be poor.

The polyamide curing agent may be prepared by reacting one or more excess multifunctional amines with one or more fatty dimers. Suitable fatty dimers are known in the art. A suitable process for preparing a polyamide curing agent is disclosed in, for example, COATING PROCESS, Edited by Dengliang Liu, Version 4, 2010, pages 258-302, which is incorporated herein by reference.

In various embodiments, the Mannich base curing agent may have an amine value of 150 mg KOH/g curing agent or more, or 180 mg KOH/g curing agent or more, or 200 mg KOH/g curing agent or more. In typical applications, the amine value of the Mannich base curing agent is no greater than 300 mg KOH/g curing agent, or no greater than 250 mg KOH/g curing agent. The amine value may be determined according to GB/T 6365-2006. It has been observed that Mannish base curing agent having too high amine value, for example having 300 mg KOH/g curing agent or more, will negatively affect pot life of the two-component epoxy resin paint.

In some embodiments, the Mannich base curing agent may further include 1 wt % or more of phenolic hydroxyl group relative to the total weight of the Mannich base curing agent, or 2 wt % or more, 4 wt % or more, 5 wt % or more, or 6 wt % or more relative to the total weight of the Mannich base curing agent. In some embodiments, the Mannich base curing agent preferably contains a higher concentration of phenolic hydroxyl group, and in some typical applications the concentration of phenolic hydroxyl group is less than 10 wt % relative to the total weight of the Mannich base curing agent. The concentration of the phenolic hydroxyl group in the Mannich base curing agent can be evaluated as follows:

$$C_{OH}(\% \text{ by weight})=n \times M_{OH}/W_{Mannich\ base\ curing\ agent}$$

where $C_{OH}$ represents the concentration of the phenolic hydroxyl group, n represents the total molar amount of phenolic hydroxyl group contained in feedstock for preparing the Mannich base curing agent, $M_{OH}$ represents the molar mass of the phenolic hydroxyl group, and $W_{Mannich\ base\ curing\ agent}$ represents the total weight of the Mannich base curing agent as prepared.

The concentration of phenolic hydroxyl group falling within above range is sufficient to make it possible for the Mannich curing agent to strengthen the drying performance of two-component epoxy resin paint when the resin paint is cured at an elevated temperature, for example at a temperature of 40° C.

In various embodiments, the Mannich base curing agent has a viscosity of 2000 mPa·s or more at 25° C., or 2500 mPa·s or more at 25° C., or 3000 mPa·s or more at 25° C. In typical applications, the viscosity of Mannich base curing agent should not be too high, for example no greater than 5000 mPa·s at 25° C. The viscosity may be determined with Brookfield viscosimeter using No. 3 spindle at about 20 rpm. It has been observed that when the Mannich base curing agent has too high a viscosity, for example 6000 mPa·s at 25° C., its curing performance will be poor.

The Mannich base curing agent may be prepared by modifying a phenolic aldehyde adduct with one or more excess multifunctional amines. Suitable phenols include, but are not limited to, phenols or optionally substituted phenols, such as phenol, or alkyl substituted phenol, for example cardanol. The process for preparing a Mannich base curing agent is disclosed by for example, COATING PROCESS, Edited by Dengliang Liu, Version 4, 2010, pages 258-302, which is incorporated herein by reference.

In an embodiment of the present disclosure, the ratio by weight of the Mannich base curing agent to the polyamide curing agent is in the range of 10:90 to 90:10, or 20:80 to 80:20.

In some embodiments, the amine component further includes a curing accelerator. The term "curing accelerator" as used herein refers to a compound that does not contain active amine hydrogen atoms by itself, but is capable of promoting the reaction of epoxy groups with other active amine hydrogen atoms. Preferably, the curing accelerator is chosen from tertiary amines containing a phenolic hydroxyl group, preferably tri-(dimethylaminomethyl)phenol. As examples of the curing accelerator, any suitable commercial product may be used, for example those available under the trade designation DMP-30 from Sanfeng Chemical Ltd., Chang Zhou, China.

In various embodiments, the amount of the curing accelerator about 0.5 wt % to about 2 wt %, or about 0.6 wt % to about 1.8 wt %, or about 0.8 wt % to 1.6 wt % relative to the total weight of the amine component.

Epoxy Resin Component

The epoxy resin component is a resin composition constituting the main body of the coating formed by the epoxy resin paint. In various embodiments, the coating typically includes an epoxy resin, a liquid petroleum resin, a filler package and optionally additional additives.

The term "epoxy resin" as used herein refers to a polymer or oligomer containing two or more epoxy groups in one molecule. In various embodiments, the epoxy resin may contain at most four epoxy groups in one molecule, or two or three epoxy groups in one molecule.

In various embodiments, the epoxy resin may have an epoxy value of 0.1 equivalent/100 g epoxy resin or more, or 0.2 equivalent/100 g epoxy resin or more, or 0.3 equivalent/100 g epoxy resin or more, or 0.4 equivalent/100 g epoxy resin or more, or 0.5 equivalent/100 g epoxy resin or more, wherein the epoxy value is defined as the molar amount of epoxy functional group contained in 100 g of the epoxy resin.

In various embodiments, the epoxy resin is preferably a liquid at room temperature of about 25° C., and has a viscosity of 10,000 mPa·s or less at 25° C., or 8,000 mPa·s or less at 25° C., or 6,000 mPa·s or less at 25° C. or less than 2,500 mPa·s at 25° C. The viscosity may be determined by Brookfield viscometer using No. 3 spindle at 20 rpm.

Suitable epoxy resins include, but are not limited to, diglycidyl ether of polyhydric phenol, such as diglycidyl ether of resorcinol, diglycidyl ether of catechol, diglycidyl ether of hydroquinone, diglycidyl ether of bisphenol A, diglycidyl ether of bisphenol F, diglycidyl ether of bisphenol S, diglycidyl ether of tetramethyl bisphenol; diglycidyl ether of polyalcohol, such as diglycidyl ether of aliphatic diglycol and diglycidyl ether of polyether glycol, for example diglycidyl ether of C2-24 alkylene glycol, diglycidyl ether of poly(ethylene oxide) glycol or diglycidyl ether of poly(propylene oxide) glycol; or polyglycidyl ether of novolack resin, such as polyglycidyl ether of phenol-formaldehyde resin, polyglycidyl ether of alkyl substituted phenol-formaldehyde resin, polyglycidyl ether of phenol-hydroxyl benzaldehyde resin, or polyglycidyl ether of cresol-hydroxyl benzaldehyde resin; or the combinations thereof.

In some embodiments, the epoxy resin is the diglycidyl ether of polyhydric phenol, particularly having the structure of formula (I):

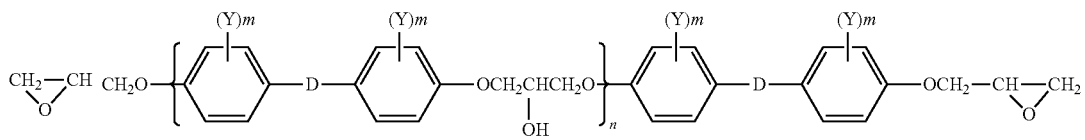

wherein

D each independently represents —S—, —S—S—, —SO—, —SO$_2$—, —CO$_2$—, —CO—, —O—, $C_1$ to $C_{10}$ alkylene, $C_1$ to $C_5$ alkylene, or $C_1$ to $C_3$ alkylene, such as, for example, —CH$_2$— or —C(CH$_3$)$_2$—, Y each independently represents halogen, such as F, Cl, Br, or I, or optionally substituted monovalent C1 to C10 hydrocarbon groups, such as optionally substituted methyl, ethyl, vinyl, propyl, allyl or butyl;

m each independently represents 0, 1, 2, 3 or 4, and n represents an integer from 0 to 4, such as 0, 1, 2, 3 or 4.

In some embodiments, the epoxy resin is bisphenol A epoxy resin, bisphenol S epoxy resin or bisphenol F epoxy resin having the structure of formula (I) in which D represents —C(CH$_3$)$_2$—, —SO$_2$— or —CH$_2$— respectively, m represents 0, and n represents an integer from 0 to 4.

In some embodiments, the epoxy resin is bisphenol A epoxy resin having the structure of formula (I) in which D represents —C(CH$_3$)$_2$—, m represents 0, and n represents an integer from 0 to 4.

The epoxy resin as disclosed in the present disclosure may be prepared, for example, using epichlorohydrin technology. Alternatively, as an example of epoxy resin, any suitable commercial product may be used, for example, those available under the trade designations E55, E51, E44, or E20 available from Kaiping Resin Company, Shanghai, China.

In various embodiments, the epoxy resin is used as a resin component of the epoxy resin component. In one aspect, the resin component functions as a binder which provides adhesion to a substrate, for the two-component epoxy resin paint, and holds together other components, such as fillers, of the epoxy resin component to impart basic cohesive strength to the coating. In another aspect, the resin component has good reactivity with the amine component as a curing agent, thereby providing a coating having good mechanical strength.

In various embodiments, the epoxy resin component includes about 10 wt % to about 85 wt %, or about 25 wt % to 65 wt % of the epoxy resin, relative to the total weight of the epoxy resin component. In particular, the epoxy resin component includes about 30 wt %, about 35 wt %, or about 40 wt %, about 45 wt %, or about 50 wt % or 55 wt % of the epoxy resin, relative to the total weight of the epoxy resin component.

In some embodiments, the epoxy resin component further includes a liquid petroleum resin, which as used therein refers to a thermoplastic resin obtained by copolymerization of petroleum cracking product with aldehydes. In various embodiments, the liquid petroleum resin has a softening point of less than 150° C., or less than 135° C., or less than 120° C. In various embodiments, the petroleum cracking product has a molecular weight of 2000 g/mol or less, or 1500 g/mol or less.

In one embodiment of the present disclosure, C9 petroleum resin is used. In one embodiment of the present disclosure, C5 petroleum resin is used. In one especially preferred embodiment of the present disclosure, C9 petroleum resin is used as a liquid petroleum resin. As examples of a liquid petroleum resin, any suitable commercial product may be used, for example, C9 petroleum resin available from Xintian Chemical Company, Puyang, China.

It has been surprisingly found by the inventors that incorporation of a liquid petroleum resin can improve wetting performance of the resin component to a substrate, especially metal, and provides a coating having greater water resistance. It has been also surprisingly found by the inventors that incorporation of a liquid petroleum resin can also improve adhesion of the coating to a substrate and enhance its corrosive resistance, especially salt fog resistance.

In various embodiments, the epoxy resin component includes about 1 wt % to about 20 wt %, or about 5 wt % to 15 wt % of the liquid petroleum resin, or about 7 wt % to 13 wt % of the liquid petroleum resin, relative to the total weight of the epoxy resin component. In some embodiments, the epoxy resin component includes about 7 wt %, about 9 wt %, about 11 wt %, or about 13 wt % of the liquid petroleum resin, relative to the total weight of the epoxy resin component.

In some embodiments, the epoxy resin component may optionally include a filler package. As used herein, the term, "filler", is intended to refer to any coating volume extender, in the form of e.g., inorganic particles, suitable for the epoxy resin component. There is no particular limitation on the shape of particles, and the filler may have any suitable shape, for example, spherical, ellipsoid, pellet, or other irregular shapes. The particle size of the filler may vary over a broad range, e.g., from about 10 nanometers to about 50 micrometers. In addition to function as a coating volume extender, some fillers may impart one or more desired properties to the composition and/or coating resulting from the composition. For example, some fillers may impart desired color to the composition and hence the coating resulted from the composition, and in this case such fillers may be also referred to as "pigments". Some fillers may improve chemical and/or physical properties, in particular mechanical properties of the coating resulting from the composition, and in this case they may also be referred to as "enforcing additives".

In an embodiment of the present disclosure, which is not intended to be limiting, the filler package includes one or more of silicate salts, sulfate salts, carbonate salts or silicon dioxides. Suitable exemplary fillers include kaolin, wollastonite, calcium carbonate, diatomite, talc, barium sulfate, magnesium aluminum silicate, silica, or any combination thereof.

In one embodiment, which is not intended to be limiting, the filler package includes 5-40 wt % of one or more silicate salts, such as wollastonite or talc; 10-40 wt % of one or more sulfate salts, such as barium sulfate; 0-25 wt % of one or more carbonate salts, such as calcium carbonate; and 0-20 wt % of one or more silicon dioxides, relative to the total weight of the filler package. In another non-limiting embodiment, the filler package includes 15-25 wt % of barium sulfate; 3-6 wt % of talc and 3-6 wt % of wollastonite, relative to the total weight of the filler package. It has been found that above filler package results in reduced oil adsorption and smoother coating surface.

In some embodiments, the filler package further includes an optional rust inhibitor. The term "rust inhibitor" as used herein refers to an agent that may prevent a metal substrate from rusting. In an embodiment of the present disclosure, the rust inhibitor may be zinc phosphate, ion-exchanged silica or a combination thereof. Any suitable commercial rust inhibitor may be used such as, for example, zinc phosphate white 409-1 available from Gehuang pigment company, Shanghai City, China, or ion-exchanged silica available under the trade designation AC-3 from Grace Company, UK. In various embodiments, the filler package includes 1 to 5 wt %, or 1 to 3 wt %, of a rust inhibitor relative to the total weight of the filler package.

In various embodiments, the total amount of the filler package may vary over a wide range, for example from about 5 wt % to about 70 wt %, or from about 15 wt % to about 65 wt %, relative to the total weight of the epoxy resin component.

In some embodiments, the epoxy resin component may include additional optional additives such as, for example, wetting and dispersing agents, defoamers, thickeners, flatting agents, solvents, pigments, or any combination thereof.

Suitable wetting and dispersing agents include, but are not limited to, ionic wetting and dispersing agents, non-ionic wetting and dispersing agents, or multifunctional wetting and dispersing agent. All these types of wetting and dispersing agents are commercially available. For example, a suitable ionic wetting and dispersing agents is available under the trade designation Dispers 715W from Tego Company, Germany, a suitable non-ionic wetting and dispersing agent is available under the trade designation Dispers 740 W from Tego Company, and a suitable multi-functional wetting and dispersing agent is available under the trade designation Dispers 760W from Tego Company.

Suitable defoamers may include organic siloxane defoamers, polyether defoamers, polyether-modified organic siloxane defoamers, or any combination thereof. All these types of defoamers are commercially available. For example, a suitable organic siloxane defoamer is available under the trade designation BYK 024 from BYK Company, Germany, a suitable polyether defoamer is available under the trade designation BYK-1660 from BYK Company, and a suitable polyether-modified organic siloxane defoamer is available under the trade designation TEGO Foamex 810 from EVONIK Company, Germany.

Suitable thickeners include, for example, polyurethanes, cellulose ethers, or any combination thereof. All these types of thickeners may be commercially available products such as, for example, polyurethane thickeners available under the trade designation RM-8W available from Rohm & Haas Corporation, US, and cellulose ether thickeners available under the trade designation Bermocoll EBS 451 FQ from Akzo Nobel, Netherlands.

Suitable flatting agents include, but are not limited to, polysiloxanes, acrylic polymers, or any combination thereof. All these types of flatting agents may be commercially available products such as, for example, a polysiloxane flatting agent available under the trade designation 1660 from BYK Company, Germany.

Suitable solvents may include any known solvent suitable for coating compositions including, but not limited to, aliphatic hydrocarbons, aromatic hydrocarbons, terpenes, alcohols, ketones, esters, alcohol ethers, ester ethers, substituted hydrocarbons or any combination thereof. In some embodiments, the solvent includes esters, alcohols or any combination thereof, preferably butyl acetate, ethanol or the combination thereof.

To obtain a coating composition with a desired color, suitable pigments may include, but are not limited to, iron oxide, carbon black, lead oxide, lead carbonate, zinc oxide, titanium oxide, ultramarine, chrome green or chrome oxide or any combination thereof. In an embodiment, titanium oxide may be used as a pigment.

The amount of various optional components should be selected to achieve their desired purpose, but not be used amounts that degrade the properties of the coating composition and the cured coating obtained therefrom. In various embodiments, the total amount of the additional additives is about 0.1 wt % to about 15 wt %, relative to the total weight of the epoxy resin component.

The epoxy resin component may be prepared by any suitable compounding process such as, for example, by adding an epoxy resin, a liquid petroleum rein, a filler package and if any, additional additives, into a vessel, and agitating the resulting mixture to be homogeneous.

In various embodiments, the weight ratio of the amine component to the epoxy resin component can be varied in the range of 8:100 to 20:100. In general, when the weight ratio of the amine component to the epoxy resin component is less than 8:100, the curing performance of the coating will be poor. In general, when the weight ratio of the amine component to the epoxy resin component is greater than 20:100, the operating performance of the obtained epoxy resin paint and/or the mechanical properties of the resulting coating will decrease. During the preparation process of the amine component and/or the epoxy resin component, additional inert diluent may be added that will not affect the reactivity of one or both components, such as, for example, to reduce the viscosity of the components. Therefore, the weight ratio of the amine component and the epoxy resin component is not limited to the above range, and can be adjusted according to actual demand.

In various embodiments, the two-component epoxy resin paint can be prepared by simply mixing the epoxy resin component with the amine component in a mixing device at a predetermined weight ratio before application. The resulting epoxy resin paint can be applied in a variety of ways that are familiar to those skilled in the art, including spraying (e.g., air assisted, airless or electrostatic spraying), brushing, rolling, flooding and dipping. In an embodiment of the present disclosure, the resulting epoxy resin paint is coated by spraying. The epoxy resin paint can be applied in various wet film thicknesses to form a coating with a dry thickness from about 13 to about 260 microns (about 0.5 to about 10 mils), or from about 25 to about 75 microns (about 1 to about 3 mils). The applied paint may be cured by air drying or by accelerating drying with various drying devices (e.g., ovens) that are familiar to those skilled in the art. The preferred heating temperature for curing epoxy resin paint is about 30° C. to about 50° C., and more preferably is about 35° C. to about 55° C., and the preferred heating time for curing epoxy resin paint is at least 3 minutes to less than 60 minutes, less than 45 minutes, or less than 40 minutes. Drying time will tend to decrease with increasing temperature or increasing air flow.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples are commercially available and used directly without further treatment.

Test Methods

Pot life testing was performed by mixing the two components of the epoxy resin paint of the present disclosure, placing the resulting mixture at room temperature of 20±1° C., and determining the period for which the viscosity of the system reaches at most 2 times of its initial viscosity.

Low temperature curing time was determined by applying the epoxy resin paint of the present disclosure on a substrate, and determining the period for which the pencil hardness of the formed film reaches 2B at 5° C., wherein the pencil hardness of the film was determined according to GB/T 6739.

High temperature curing time was determined by applying the epoxy resin paint of the present disclosure on a substrate, and determining the period for which the pencil hardness of the formed film reaches H at 40° C., wherein the pencil hardness of the film was determined according to GB/T 6739.

Salt spray testing was a standardized method to determine corrosion resistance of coatings applied to metal substrates. The test was conducted in a salt spray cabinet, where a salted solution (typically 5% NaCl) was atomized and sprayed on to the surface of a test panel to which the two component epoxy resin paint of the present disclosure was applied. The panel was thus maintained in a salt fog that duplicates a highly corrosive environment. Test parameters were used according to ASTM Bl 17 (Standard Practice for Operating Salt Fog Apparatus).

Panels subjected to salt spray testing were then analyzed for corrosion resistance by cross-hatch adhesion testing with blister rating. With the GB/T 1771 standard, blisters are rated on a scale of 0 to 10 in which a blister rating of 0 represents that less than 10 area % of coating blisters and a blister rating of 10 represents that 100 area % of coating blister and a blister rating of 6 implies that 60 area % or more but less than 70 area % of coating blister. Larger blister area of the coating indicates that the coating has poorer corrosion resistance.

TABLE 1

Materials used for various examples

| Item | Materials | Supplier | Description |
|---|---|---|---|
| 1 | E20 | Kaiping Resin Company, Shanghai, China | Bisphenol A epoxy resin |
| 2 | C9 Petroleum Resin | Xintian Chemical Company, Puyang, China | Liquid petroleum resin |
| 3 | DMP-30 | Sanfeng Chemical Ltd., Changzhou, China | Curing promoter |
| 4 | Barium Sulfate | Shuangfeng Chemical Company, Yangzhou, China. | Filler |
| 5 | Talc Powder | Gaoke Chemical Company, Changzhou, China | Filler |
| 6 | Wollastonite | Yongling Chemical Company, Anhui, China | Filler |
| 7 | 409-1 | Gehuang Pigment Company, Shanghai, China | Zinc phosphate |
| 8 | AC-3 | Grace, UK | Ion-exchanged silica |
| 9 | 1660 | BYK, Germany | Polyether modified organic siloxane |
| 10 | Butyl acetate | General chemicals | Solvent |
| 11 | Butanol | General Chemicals | Solvent |
| 12 | SM650 | Sanmu Company, Jiangsu, China | Polyamide curing agent for control |
| 13 | T-31 | Junjiang Polymer Material Company, Shanghai China | Phenolic aldehyde amine curing agent for control |

Example 1

Preparation of Polyamide Curing Agent

At room temperature, 150 g of a mixture of 1,4-diaminocyclohexane, ethylene diamine and m-phenylene diamine in a weight ratio of 1:1:1 and 100 g of No. 14 dimeric acid available from Union Camp were added to four-neck flask mounted with thermometer, top stirrer, gas inlet and distillation unit. The resulting reaction mixture was heated to 100-120° C. Through azeotropic distillation, the formed water was removed from the reaction mixture. When no reaction water was formed, the reaction stopped. The resulting product will be determined as the present polyamide curing agent.

After testing, the polyamide curing agent had an amine value of 150 mg KOH/g curing agent and a viscosity of 2500 mPa·s at a temperature of 25° C.

Preparation of Mannich Base Curing Agent

At room temperature, 150 g of a mixture of 1,4-diaminocyclohexane, ethylene diamine and m-phenylene diamine in a weight ratio of 1:1:1 and 100 g of 1:1 formaldehyde phenol adduct were added to four-neck flask mounted with thermometer, top stirrer, gas inlet and distillation unit. The resulting reaction mixture was heated to 100-105° C. Through azeotropic distillation, the formed water was removed from the reaction mixture. When no reaction water was formed, the reaction stopped. The resulting product will be determined as the present Mannich base curing agent.

After testing, the Mannich base curing agent had an amine value of 200 mg KOH/g curing agent and a viscosity of 2000 mPa·s at a temperature of 25° C.

Preparation of Curing Component

In a mixing vessel, above prepared polyamide curing agent and Mannich base curing agent were mixed in a weight ratio of 1:1 and 1% DMP 30 was added to the resulting mixture, thereby obtaining the present amine component.

Preparation of Epoxy Resin Component

In a mixing vessel, 45.5 kg of bisphenol A epoxy resin, 15 kg of liquid petroleum resin, 35 kg of a filler package including 1-3% of zinc phosphate, 3-6% of talc powder, 0.6-1.3% of ion-exchanged silica, 15-25% of precipitated barium sulfate and 3-6% of Wollastonite, and 0.5 kg of additional additives including 0.1-5% of polyether modified organic siloxane, 95-99.9% of butyl acetate and ethanol were added and mixed with stirring at 800-1000 rpm until it reaches homogeneous, thereby obtaining the present epoxy resin component.

Preparation of Two-Component Epoxy Resin Paint

Before application, above prepared epoxy resin component and amine component were mixed in a weight ratio of 100:12 and tested for its pot life. After testing, the two-component epoxy resin paint had a pot life of 6 hours at 20° C.

Coating Formulation

A suitable amount of the present two-component epoxy resin paint was spray applied onto a panel so that a coating having a dry film thickness of about 50 micrometers was formed.

As described in testing method, low temperature curing time at 50° C., high temperature curing time at 40° C. and salt spray resistance of the coating were measured and listed in the following table 2.

Comparative Example A

Above prepared epoxy resin component and the commercial available polyamide curing agent were mixed in a weight ratio of 100:12 and tested for its pot life. After testing, the two-component epoxy resin paint had a pot life of 10 hours at 20° C.

A suitable amount of above two-component epoxy resin paint was spray applied onto a panel so that a coating having a dry film thickness of about 50 micrometers was formed. As described in testing method, low temperature curing time at 50° C., high temperature curing time at 40° C. and salt spray resistance of the coating were measured and listed in the following table 2.

Comparative Example B

Above prepared epoxy resin component and the commercial available Mannich base curing agent were mixed in a weight ratio of 100:12 and tested for its pot life. After testing, the two-component epoxy resin paint had a pot life of 7 hours at 20° C.

A suitable amount of above two-component epoxy resin paint was spray applied onto a panel so that a coating having a dry film thickness of about 50 micrometers was formed. As described in testing method, low temperature curing time at 50° C., high temperature curing time at 40° C. and salt spray resistance of the coating were measured and listed in the following table 2.

TABLE 2

| Examples | Drying speed | | Corrosive resistance | | Pot life (20° C.) |
| --- | --- | --- | --- | --- | --- |
| | curing time@5° C. | curing time@40° C. | Rusting length (mm/h) | blistering | |
| Example 1 | 2 h | 30 min | 2.0 mm@600H | 0 | 6 h |
| Comp. Ex A | 15 h | 90 min | 2.0 mm@300H | 6 | 10 h |
| Comp. Ex B | 7 h | 50 min | 2.0 mm@380H | 6 | 7 |

Note:
rusting length refers to the distance between the rusted portion and cross-hatch as baseline.

As can be seen from the above results, the two-component epoxy resin paint of the present disclosure had a balance of pot life and drying speed, while having excellent corrosive resistance.

While the invention has been described with respect to a number of embodiments and examples, those skilled in the art, having benefit of this disclosure, will appreciate that other embodiments can be devised which do not depart from the scope and spirit of the invention as disclosed herein.

What is claimed:

1. A two-component epoxy resin paint, comprising:
   a) an epoxy resin component; and
   b) an amine component for curing the epoxy resin component, the amine component comprising:
      i) at least one polyamide curing agent; and
      ii) at least one Mannich base curing agent,
      wherein each of the polyamide curing agent and the Mannich base curing agent is derived from one or more multifunctional amines comprising at least one cycloaliphatic multifunctional amine, and
      wherein the cycloaliphatic multifunctional amine is present in an amount of 30 wt % or more relative to the total amount of the multifunctional amines, and
      wherein the ratio by weight of the epoxy resin component a) to the amine component b) is 100:8 to 100:20.

2. The two-component epoxy resin paint according to claim 1, wherein the cycloaliphatic multifunctional amine is present in an amount of 40 wt % or more relative to the total amount of the multifunctional amine.

3. The two-component epoxy resin paint according to claim 1, wherein the cycloaliphatic multifunctional amine comprises a multifunctional amine containing at least one cyclohexyl, cycloheptyl, cyclopentyl or the combination thereof.

4. The two-component epoxy resin paint according to claim 1, wherein the weight ratio of the Mannich base curing agent to the polyamide curing agent is 10:90 to 90:10.

5. The two-component epoxy resin paint according to claim 1, wherein the polyamide curing agent has an amine value of 100 mg KOH/g curing agent or more, and comprises 1 wt % or more of ethylenically unsaturated functional groups relative to the total weight of the polyamide curing agent.

6. The two-component epoxy resin paint according to claim 5, wherein the polyamide curing agent has a viscosity of 2000 mPa·s or more at 25° C.

7. The two-component epoxy resin paint according to claim 1, wherein the Mannich base curing agent has an amine value of 150 mg KOH/g curing agent or more, and comprises 1 wt % or more of phenolic hydroxy groups relative to the total weight of the Mannich base curing agent.

8. The two-component epoxy resin paint according to claim 7, wherein the Mannich base curing agent has a viscosity of 2000 mPa·s or more at 25° C.

9. The two-component epoxy resin paint according to claim 1, wherein the amine component further comprises a curing accelerator chosen from a tertiary amine containing group and a phenolic hydroxyl group.

10. The two-component epoxy resin paint according to claim 1, wherein the epoxy resin component comprises, relative to the total weight of the epoxy resin component,
    10 to 85 wt % of an epoxy resin;
    1 to 20 wt % of a liquid petroleum resin,
    5 to 70 wt % of a filler package; and
    0 to 15 wt % of additional additives comprising wetting and dispersing agents, defoamers, thickeners, flatting agents, solvents, pigments, or any combination thereof.

11. The two-component epoxy resin paint according to claim 10, wherein the epoxy resin has an epoxy value of 0.1 equivalent/100 g epoxy resin or more, the epoxy value being defined as the molar amount of epoxy functional group contained in 100 g of the epoxy resin.

12. The two-component epoxy resin paint according to claim 10, wherein the epoxy resin has a viscosity of 10,000 mPa·s or less at 25° C.

13. The two-component epoxy resin paint according to claim 10, wherein the epoxy resin comprises a diglycidyl ether of polyhydric phenol, a diglycidyl ether of polyalcohol, or a polyglycidyl ether of a novolac resin, or combinations thereof.

14. The two-component epoxy resin paint according to claim 13, wherein the epoxy resin is the diglycidyl ether of the polyhydric phenol of formula (I):

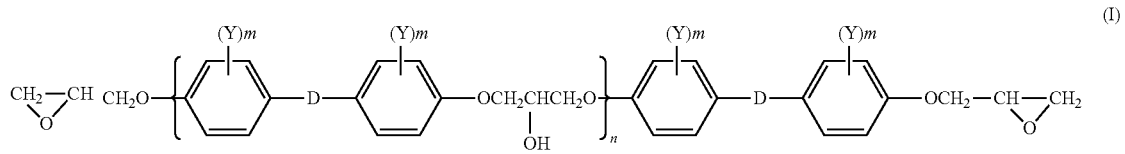

wherein
D each independently represents —S—, —S—S—, —SO—, —SO$_2$—, —CO$_2$—, —CO—, —O—, or C$_1$ to C$_{10}$ alkylene,
Y each independently represents halogen or optionally substituted monovalent C$_1$ to C$_{10}$ hydrocarbon group,
m each independently represents 0, 1, 2, 3 or 4, and
n represents an integer from 0 to 4.

15. The two-component epoxy resin paint according to claim 10, wherein the liquid petroleum resin has a molecular weight of 2000 g/mol or less.

16. The two-component epoxy resin paint according to claim 10, wherein the filler package comprises, relative to the total weight of the filler package,
1 to 5 wt % of one or more rust inhibitors;
5 to 40 wt % of one or more silicate salts;
10 to 40 wt % of one or more sulfate salts;
0 to 25 wt % of one or more carbonate salts; and
0 to 20 wt % of one or more silicon dioxides.

17. The two-component epoxy resin paint according to claim 1, wherein the paint is a primer, a topcoat, an intermediate coat, or a DTM coating.

* * * * *